Sept. 24, 1957     H. TROEGER ET AL     2,807,342
EMERGENCY QUICK DISCONNECT FOR GENERATOR
Filed Feb. 1, 1955     2 Sheets-Sheet 1

INVENTORS
RODERICK W. STELZEL
HENRY TROEGER
BY
Nicholas J. Garofalo
ATTORNEY

Sept. 24, 1957 H. TROEGER ET AL 2,807,342
EMERGENCY QUICK DISCONNECT FOR GENERATOR
Filed Feb. 1, 1955 2 Sheets-Sheet 2

INVENTORS
RODERICK W. STELZEL
BY HENRY TROEGER
Nicholas J. Garofalo
ATTORNEY

United States Patent Office 2,807,342
Patented Sept. 24, 1957

2,807,342

EMERGENCY QUICK DISCONNECT FOR GENERATOR

Henry Troeger, Ramsey, and Roderick W. Stelzel, Hohokus, N. J., assignors to Bendix Aviation Corporation, Teterboro, N. J., a corporation of Delaware Application February 1, 1955, Serial No. 485,478

12 Claims. (Cl. 192—36)

This invention concerns emergency quick disconnect coupling means of an improved and practical nature that finds particular use in aircraft in coupling an accessory, such as a generator or other detachable driven member, to a driving member. The invention is particularly suited to aircraft use, as it allows a quick disconnection of the accessory from the engine when the accessory fails or malfunctions. A particular advantage of the invention is afforded in the manner whereby disassociation of the accessory and engine members is accomplished not only swiftly, but also without resultant damage to either of the members.

A feature of the invention is that it may be accommodated in a cavity conventionally existing in the mounting flange portion of conventional accessory devices, for example, the cavity of the mounting flange of a generator.

A further feature of the invention is found in certain spring tensioned pin means which operates, after the accessory has been separated from the engine, to hold the accessory in disconnected relation to the engine without danger of the two accidentally contacting one another.

A general object of the invention is, therefore, to provide means for quickly disconnecting a driven accessory member from a driving member, and to do so without damage to either member and without fear of the disconnected members accidentally reuniting.

The invention further lies in the particular structure, organization and arrangement of the various elements thereof, as well as in their cooperative association with one another for the purposes intended.

The foregoing and other objects and advantages of the invention will appear more fully hereinafter from a consideration of the detailed description which follows, taken in conjunction with the accompanying drawings wherein an embodiment of the invention is illustrated by way of example. It is to be expressly understood, however, that the drawing is for purposes of illustration and description only, and is not intended as a definition of the limits of the invention.

Fig. 1 of the drawings is a longitudinal cross section of a quick disconnect coupling device embodying the invention, and illustrating a driven member connected to a driving member;

Fig. 3 is a detail in elevation of the driving spline member; and

Figure 1:
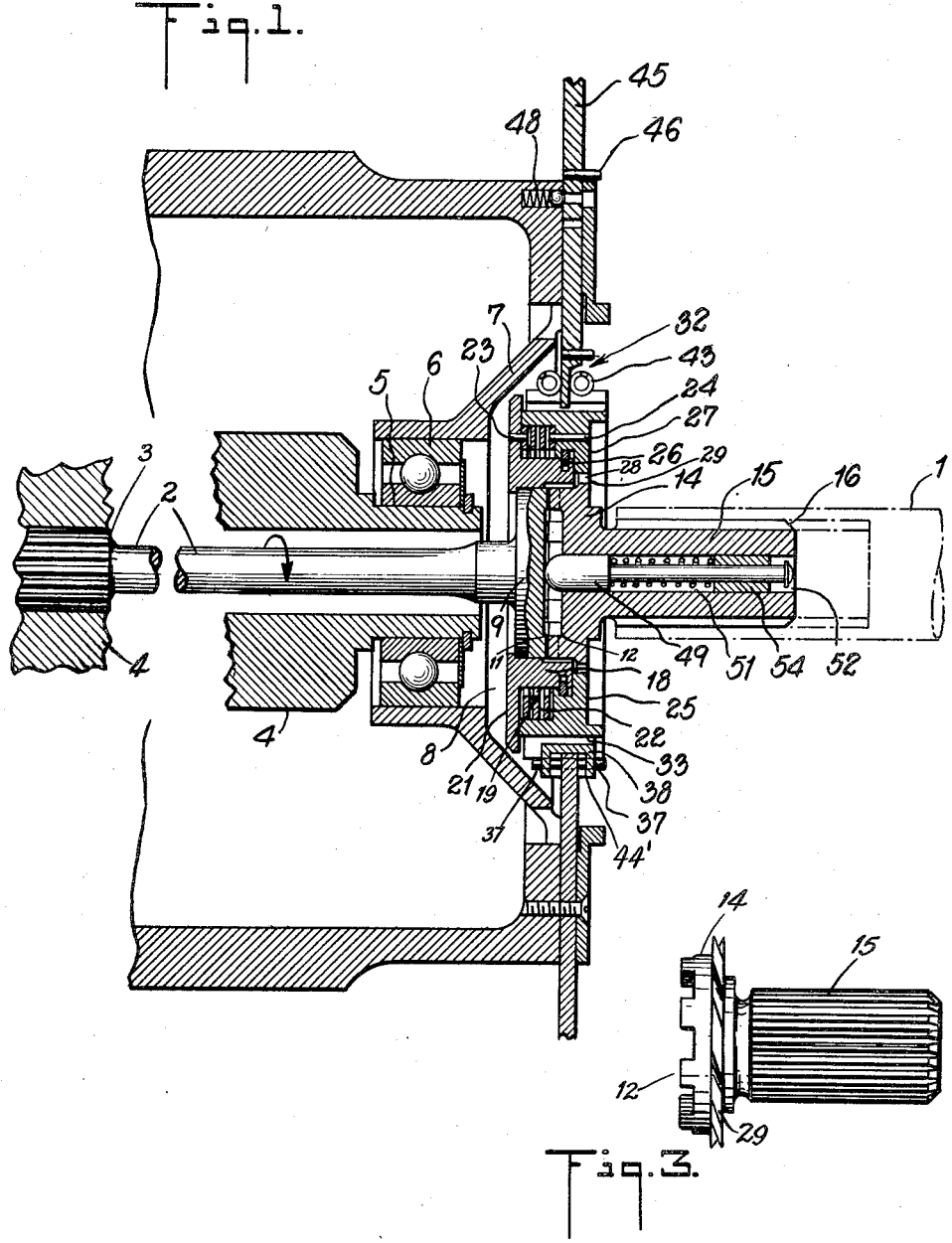

Now referring to the drawings, there is shown the driving end of an engine drive shaft 1, such as that of an associated aircraft engine, not shown, which end is coupled to a driven shaft 2. The latter may be the operating shaft of a pump or other driven accessory. Here, it is the quill shaft of a generator. Shaft 2 is splined by a portion 3 to the interior of a hollow armature shaft 4; and, when shaft 2 is driven, it carries the armature shaft around with it. The armature shaft is supported at a reduced end 5 for rotation in a bearing member 6 that is carried by a mounting flange 7 of the armature housing. The free end of the quill shaft projects through the open end of the armature shaft into a cavity 8 of the mounting flange. In the end face of a head 9, at the free end of the quill shaft, is a ring of shallow radial splines 11. The latter are engageable by complementary face splines 12 in the end face of a driving head 14 that is carried at the end of a splined stub shaft 15. The latter is splined at 16 for axial slidable movement in a recessed end portion of engine drive shaft 1.

Figure 2:
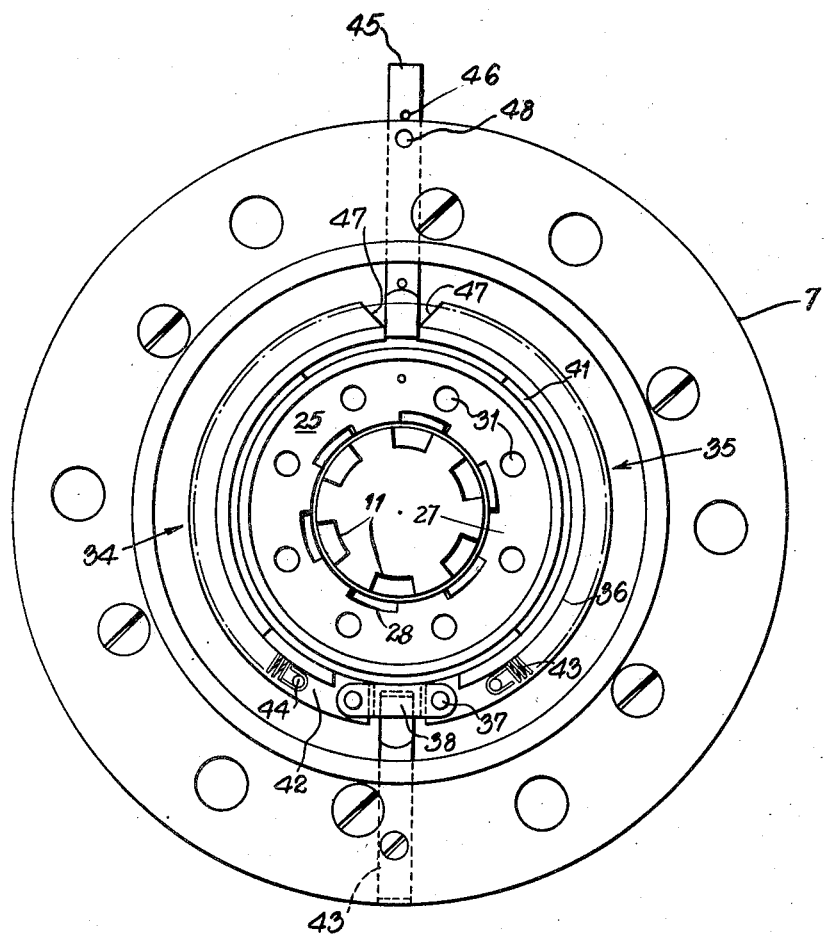
Fig. 2 is a right end view of Fig. 1 with the driving member removed.
Figure 4:
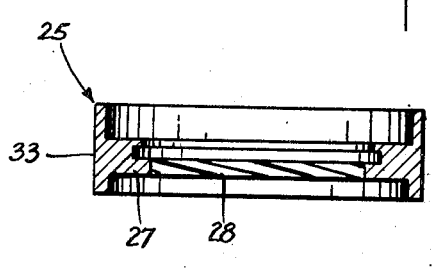
Fig. 4 is a cross section through the nut member.

Means is provided for releasably holding the driving and driven splined members 14 and 9 together for rotation of the one with the other. To this end, there is fitted fast to the periphery of the quill shaft head a thickened ring part 18, having a peripheral surface or shoulder 19 backed by a radial flange or plate 21. Shoulder 19 extends a little beyond the spline face end of the quill shaft. Surrounding shoulder 19 is a torsion spring 22, an end of which is pinned at 23 to the right face of back plate 21; and the other end of which is pinned at 24 to the left face of a surrounding nut member 25. The latter is held to ring member 18 by a snap ring 26, fitted partly in a groove of the shoulder 19 and partly in an opposed channel of nut member 25. An annular lip 27 of the nut member extends radially down to the right of an end wall of ring member 18. Right handed female helical splines 28 are formed in this extending lip 27. These are engageable by complementary right handed male helical splines 29 formed about the periphery of the driving head 14. The driving shaft 1 is here designed for counter-clockwise rotation (Figs. 1, 2); were it designed for clockwise rotation, the helical splines would be reversed or to the left.

In coupling the splined members to one another for counter-clockwise rotation of the driven with the driving member, it is necessary that the nut member 25 be first turned slightly in a clockwise direction (Figs. 1, 2) to enable feeding of the related splines of the coupling members into one another and to provide a limited winding of the torsion spring 22. Holes 31 in the outer face of the nut member serve to accommodate a spanner wrench, to be used in this clockwise turning of the nut member. The torsion spring is slightly wound with the clockwise movement of the nut member, providing a counter-clockwise torsion action on the latter. As the nut is being turned clockwise, the face and helical splines of the driving coupling are fed into the paths of the complementary splineways; and they are drawn and locked in full engagement with one another as the nut member 25 is permitted to return counter-clockwise under the torsion spring. When so coupled, counter-clockwise rotation of the driving shaft 1 carries the driven member 2 around with it.

Suitable means is provided for readily disengaging the coupled members from one another. To this end, braking mechanism, generally designated 32, is provided to brake the rotational speed of the nut member relative to the driving head. This action causes the subsequently faster moving driving head to move out of splined engagement from the nut member, and, as it does so, to be jacked out of splined engagement from the quill shaft head 9. To enable this braking action on the nut member, the latter provides a relatively broad peripheral surface 33 to serve as a brake drum for a pair of brake shoes 34, 35, each adapted to act upon a half portion of the drum surface. Shoe 35 has a band 36 pivoted at one end 37 to a brake link 38; shoe 34 has a similar band pivoted to the opposite end of link 38. Each band carries a suitable lining 41 adapted to frictionally engage the drum surface. About the center of the periphery of each shoe band is a rib 42. A pair of garter springs 43 tensioned over the surface of both shoes, one to each side of the rib members, are anchored at their ends to pins 44 projecting from opposite faces of the rib members near the brake link. The tension of springs 43 draws the brake shoes to effect a braking action on the drum nut. The position of the brake link 38 is determined by a radial pin 43. The latter is fixed in the housing and projects into link 38 between the side walls 44' thereof and freely between the pivot ends of the link.

The brake shoes are normally disabled from braking the drum nut by means of a pull pin 45 which is supported for radial slidable movement in the mounting flange 7. The lower end of the pull pin is normally positioned between the free ends of the brake bands, and it is of such a width as to hold the shoe members pivoted against the tension of the garter springs free of the brake drum. A stop 46 limits the extent to which the pull pin may be projected radially toward the drum, so as to prevent contact of the pull pin with the drum nut beneath. Beveling the ribs of the shoes as at 47 facilitates removal as well as insertion of the pull pin between the brake ends.

It is clear that pulling the pull pin out from between the brake shoes will cause the latter to effect a braking action against the brake nut and a consequent separation of the driving and driven members. The pull pin may be drawn by a pull cord, a solenoid operated mechanism or other suitable means, not shown. A detent means 48 cooperable with a keeper hole in the pull pin serves to releasably hold the normal position of the pull pin.

Means are further provided to prevent the several splines of the driving head from accidentally ratcheting against the opposed splines of the nut and quill shaft. To this end, a light spring loaded plunger 49 is axially slidable under the load of its spring 51 for a short distance out of the driving head. This plunger abuts against the face of the quill shaft and holds the driving head in safe spaced relation to the quill shaft and the drum nut after disconnection of the driven and driving heads. A stop 52 in the plunger rod 53 is adapted to limit, upon uncoupling of the driving head, against a piston rod block 54 and thereby determine the extent to which the plunger will move out of the driving head. In the process of coupling the driven and driving members, the plunger is pressed inward against the tension of the spring 51. A rounded nose on the abutting end of the plunger prevents the latter from biting into the opposed driven shaft.

Although an embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In the combination of a driving member with a driven member, face splines in the driving member engaging complementary splineways in the driven member, torsion spring means tensioning the driven member in a particular angular direction, and helical splines in the driving member engaging complementary splineways in the driven member in an angular direction opposed to the tension of the torsion spring means.

2. In the combination of a driving member with a driven member, face splines in the driving member engaging complementary splineways in the driven member, torsion spring means tensioning the driven member in a particular angular direction, helical splines in the driving member engaging complementary splineways in the driven member in an angular direction opposed to the tension of the torsion spring means, the driving member adapted to rotate the driven member in an angular direction continuous with the directional tension of the torsion spring, and means for braking the rotational speed of the driven member relative to that of the driving member.

3. In the combination of a driving member with a driven member, face splines in the driving member engaging complementary splineways in the driven member, torsion spring means torsioning the driven member in a particular angular direction, helical splines in the driving member engaging complementary splineways of the driven member in a direction opposed to the directional torsion of the spring means on the driven member, the driving member adapted to rotate the driven member in an angular direction continuous with that of the torsion spring means, means for braking the rotational speed of the driven member relative to that of the driving member and, as a consequence, causing the splines of the continuing driving member to escape from the splineways of the driven member, and spring loaded means extending from the driving member against the driven member constantly urging the one away from the other.

4. In combination, a driving shaft, a driving head slidable out of an end of the driving shaft, a driven member, face splines in the driving head releasably engaging complementary face splines in the driven member, a brake drum member surrounding the driven member, torsion spring means surrounding the latter and connected at one end to the driven member and at the other to the brake drum, helical splines in the driving head releasably engaging complementary splineways in the driven member, the driving head rotatable in a direction for releasing the helical splines from the complementary splineways, the torsion spring means exerting torsion on the driven member in the angular direction of rotation of the driving shaft, and brake means for retarding the speed of rotation of the drum member relative to that of the driving shaft.

5. The combination of a driving shaft including a driving head axially slidable out of an end thereof with a driven shaft including face splines in a headed end engageable with complementary splines in the driving head, a brake drum carried upon the driven shaft by a torsion spring, helical splines in the driving head engageable with complementary splines carried by the brake drum, the helical splines being engageable in those of the brake drum in a direction opposed to that of the directional rotation of the driving head, and the torsion spring required to be tensioned first in a direction opposed to the directional rotation of the driving head to permit starting engagement of the complementary splines with one another, and the torsion spring required to be released to complete and secure the engagement of the splines with one another.

6. The combination in claim 5 including means for braking the rotational speed of the brake drum relative to that of the driving head.

7. The combination in claim 5 including brake means for braking the rotational speed of the brake drum relative to that of the driving head, and detent means for releasably holding the brake means in disabled condition.

8. In the combination of claim 5, spring loaded plunger means carried by the driving head and holding the driving head in a disengaged position from the headed end of the driven shaft.

9. In combination, a driving member, a driven member, spline elements carried by the driving member engageable with complementary spline elements carried by the driven member, screw elements carried by the driving member engageable with complementary screw elements of a nut member, torsion spring means associating the nut member with the driven member and adapted to exert a torsion force on the nut member in a direction opposed to the directional thread of the screw elements when the latter are engaged one with the other.

10. In the combination of claim 9 wherein releasable disabling means is provided for spacing the driving member in a position where its splines are disabled from engaging the complementary splines of the driven member.

11. In the combination of claim 9 wherein braking means is provided, operable against the nut member to brake any rotation of the latter subsequent to engagement of the splines and screw elements of the driving head respectively with the complementary splines of the driven member and the screw elements of the nut member.

12. In the combination of claim 11 wherein detent means normally disables operation of the braking means.

References Cited in the file of this patent

UNITED STATES PATENTS

| | | |
|---|---|---|
| 1,913,046 | Callan | June 6, 1933 |
| 2,449,893 | Gilman | Sept. 21, 1948 |